No. 834,166. PATENTED OCT. 23, 1906.
J. C. RECKWEG.
CAROUSEL.
APPLICATION FILED FEB. 12, 1906.

2 SHEETS—SHEET 1.

Witnesses
Inventor
John C. Reckweg
by
Attorneys

No. 834,166. PATENTED OCT. 23, 1906.
J. C. RECKWEG.
CAROUSEL.
APPLICATION FILED FEB. 12, 1906.
2 SHEETS—SHEET 2.
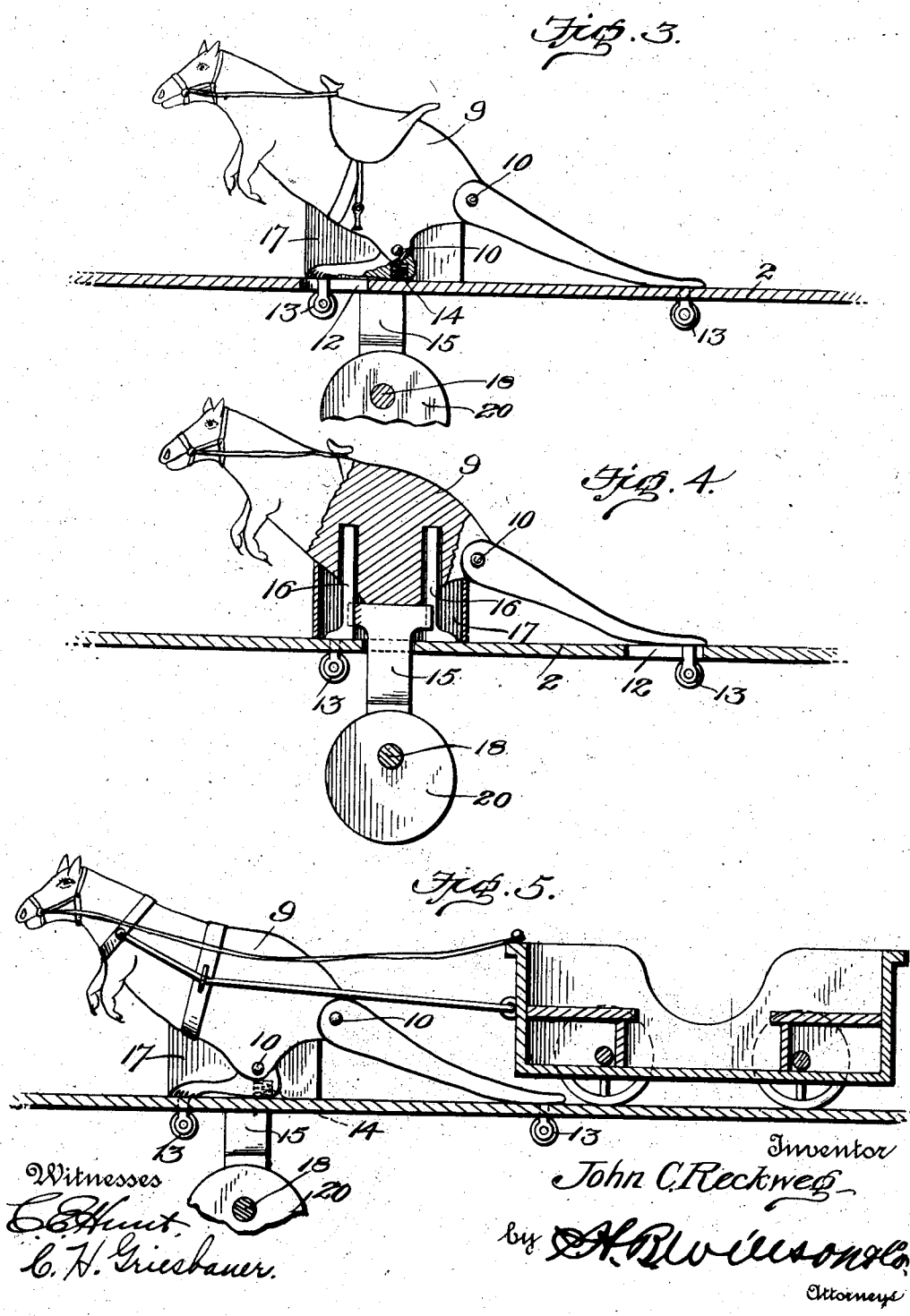

UNITED STATES PATENT OFFICE.

JOHN C. RECKWEG, OF LOS ANGELES, CALIFORNIA.

CAROUSEL.

No. 834,166.  Specification of Letters Patent.  Patented Oct. 23, 1906.

Application filed February 12, 1906. Serial No. 300,647.

*To all whom it may concern:*

Be it known that I, JOHN C. RECKWEG, a citizen of the United States, residing at Los Angeles, in the county of Los Angeles and State of California, have invented certain new and useful Improvements in Carousels; and I do declare the following to be a full, clear, and exact description of the invention, such as will enable others skilled in the art to which it appertains to make and use the same.

This invention relates to improvements in carousels or merry-go-rounds.

The object of the invention is to provide a device of this character having means whereby a jumping movement will be imparted to the figures thereon as the same are carried around by the movable portion of the platform, thereby simulating the natural movements of the animals represented by the figures.

With the above and other objects in view the invention consists of certain novel features of construction, combination, and arrangement of parts, as will be hereinafter described and claimed.

Figure 1:
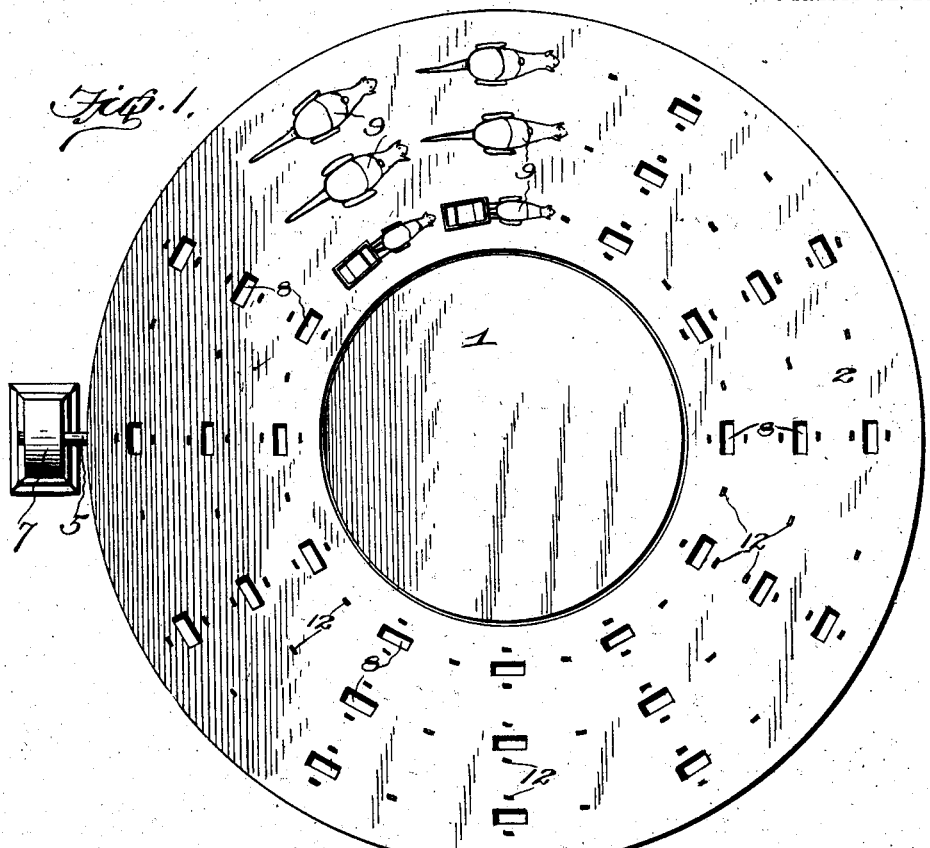
Figure 2:
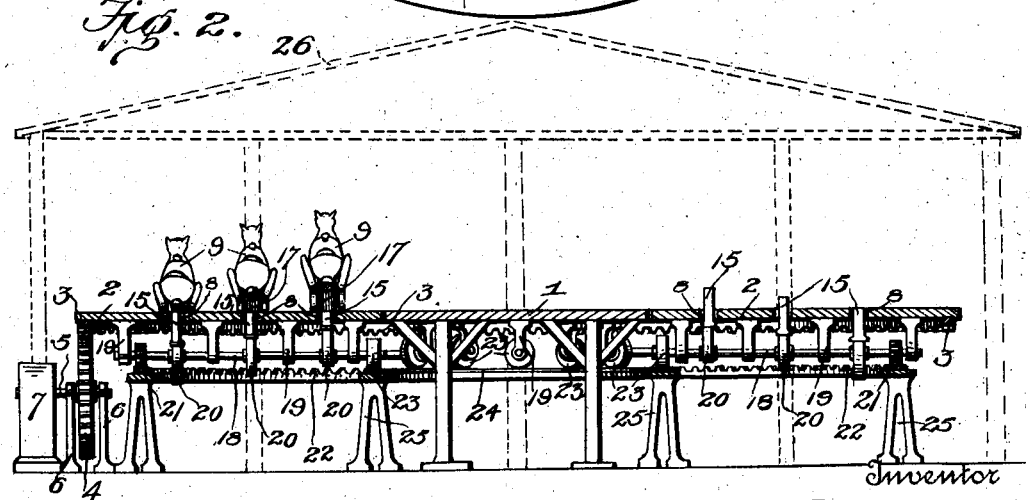

In the accompanying drawings, Figure 1 is a plan view of the stationary and movable portions of the platform of the device, showing the position of the figures, a portion of said figures being shown in place. Fig. 2 is a vertical sectional view of the same, showing the manner in which the movable platform and the figures thereon are operated. Fig. 3 is an enlarged sectional view through a portion of the movable platform, showing one of the figures in side elevation and illustrating the manner of securing said figure to the platform. Fig. 4 is a vertical sectional view of the figure and platform, showing the arrangement of the mechanism for imparting a jumping action to the figure; and Fig. 5 is a detail view of a portion of the movable platform, showing a figure representing an animal drawing a vehicle adapted to contain seats.

Referring more particularly to the drawings, 1 denotes the circular centrally-disposed stationary portion of the platform, which is suitably mounted upon posts or standards arranged beneath the same. Around the central stationary portion of the platform is arranged an annular movable portion 2, said portion being suitably supported to permit the same to revolve around the central portion 1. The movable portion of the platform is provided on its under side and near its outer edge with an annular series of gear-teeth 3, with which is adapted to be engaged a driving-gear 4, mounted upon the drive-shaft 5, journaled in standards 6 and connected with a suitable driving mechanism, which is here shown and is preferably in the form of a motor 7.

In the movable portion of the platform is formed radially-disposed slots 8, said slots being preferably arranged in circular series, as shown. Over each of the slots 8 is mounted a figure 9, said figures preferably representing an animal which travels or moves with a jumping action—as, for instance, a kangaroo. The kangaroo or other figures are preferably connected to the platform by the back legs and tail, said back legs and tail being joined, as shown at 10, and the ends of the same are connected with the platform through slots 12, said connection being provided on its under side with a roller 13, adapted to engage the under side of the platform, whereby as the animal is moved up and down to simulate a jumping action said connections will slide in the slots 12 and the rollers moved back and forth in engagement with the under side of the platform. If desired, buffer-springs 14 may be connected with the back legs or body of the animal to form a cushion, thus relieving the jar which might be occasioned by the animal striking the platform during its jumping movement. Connected to the under side of the figures are plunger-blocks 15, the lower portions of which are adapted to project through the slots 8 and below the platform. The upper portions of the blocks 15 are slidably engaged with guide-standards 16, arranged on the platform, as shown. If desired, a suitable casing 17 may be arranged around the sliding plunger-blocks and guide-standards between the lower side of the figure and the platform.

Arranged below the movable portion of the standard is an operating mechanism for imparting a jumping movement to the figures, said mechanism preferably consisting of radially-disposed shafts 18, arranged beneath each radially-disposed row of slots 8, said shaft being journaled in hangers 19, secured to the under side of the movable platform 2. On the shafts 18 immediately below each slot 8 is eccentrically mounted a cam-disk 20, said disks being arranged on the shaft in different positions or angles, whereby when the shaft is revolved the disk will engage the lower ends of the blocks 15 at different times, thereby causing a jumping movement to be imparted to the figures connected with said blocks. In order that the shafts 18 may be revolved as the movable portion of the platform is carried around, said shafts are provided with gear-pinions 21, adapted to engage a circular rack 22, which is fixedly mounted upon suitable supporting-standards arranged beneath the movable platform, as shown. If desired, the inner ends of the shaft 18 may be provided with a supporting wheel or roller 23, adapted to rest and turn upon a circular track 24, which is mounted upon suitable standards 25, also arranged beneath the movable platform.

By providing an operating mechanism such as herein shown and described the figures mounted upon the movable platform will be caused to jump upwardly after the manner of their natural gait, the arrangement of the operating mechanism being such that this movement is provided to the figures at different times, so that the figures adjacent to each other will not move at the same moment.

In Fig. 5 of the drawings is shown a figure representing an animal drawing a car or other vehicle adapted to contain seats for the reception of riders not wishing to mount the animals themselves. In practice the apparatus will be provided with a suitably-supported canopy 26, arranged above the same for the protection of the mechanism and riders, said canopy being shown in dotted lines in Fig. 2 of the drawings.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention as defined by the appended claims.

Having thus described my invention, what I claim as new, and desire to secure by Letters Patent, is—

1. In a carousel, the combination with a circular stationary platform, of an annular movable platform arranged around the same, said movable platform having a series of radially-disposed slots, figures pivotally mounted on said platform over said slots, rollers connected to the figures and extending through the slots, an annular series of rack-teeth arranged on the under side of said movable platform, a driving-gear engaged therewith, means to operate said gear, a series of eccentrically-mounted cam-disks arranged below and carried by said movable platform, means whereby said cam-disks are operated by the movement of said platform, and means whereby said disks are engaged with said figures to impart a jumping motion thereto, substantially as described.

2. In a carousel, the combination with a circular stationary platform, of an annular movable platform arranged around the same, said movable platform having a series of radially-disposed slots, figures mounted on said platform over said slots, an annular series of rack-teeth arranged on the under side of said movable platform, a driving-gear engaged with said teeth, an annular rack and an annular track fixedly mounted below said platform, a shaft journaled in hangers attached to the under side of said movable platform, a pinion mounted on one end of said shaft to engage the teeth of said annular rack as said movable platform is revolved, a roller mounted on the opposite end of said shafts to engage said annular track, eccentrically-mounted disks fixed on said shaft in different positions, and means connected with said figures on the platform and engaged by said disks whereby a jumping movement is imparted to said figures as the same are carried round by said movable platform, substantially as described.

3. In a carousel, the combination with a circular stationary platform, of an annular movable platform arranged around the same, said movable platform having a series of radially-disposed slots, figures mounted on said platform over said slots, an annular series of rack-teeth arranged on the under side of said movable platform, a driving-gear engaged with said teeth, an annular rack and an annular track fixedly mounted below said platform, a shaft journaled in hangers attached to the under side of said movable platform, a pinion mounted on one end of said shaft to engage the teeth of said annular rack as said movable platform is revolved, a roller mounted on the opposite end of said shafts to engage said annular track, eccentrically-mounted disks fixed on said shaft in different positions, plunger-blocks connected with said figures, guides to direct the movement of said blocks through the slots in said platform in position to be engaged by said disks whereby a jumping movement is imparted to said figures, substantially as described.

4. In a carousel, the combination with a circular stationary platform, of an annular movable platform arranged around the same, said movable platform having formed therein radially-disposed slots, means to support said platforms, a figure mounted over each of said slots, said figures having jointed legs, means to slidably connect the ends of said legs to the platform, buffer-springs connected with the legs of the figure, means to revolve said movable platform, a figure-operating mechanism arranged below and connected with said movable platform, plunger-blocks connected with the figures and adapted to project through the slots in said platform, a casing arranged between the figure and the platform to cover said blocks, and means actuated by said figure-operating mechanism to impart a jumping movement to said figures, substantially as described.

In testimony whereof I have hereunto set my hand in presence of two subscribing witnesses.

JOHN C. RECKWEG.

Witnesses:
 CHARLES S. ZIESMER,
 J. J. LORENZEN.